(No Model.)
F. SEYMOUR.
THEATRICAL APPLIANCE.
No. 280,525. Patented July 3, 1883.
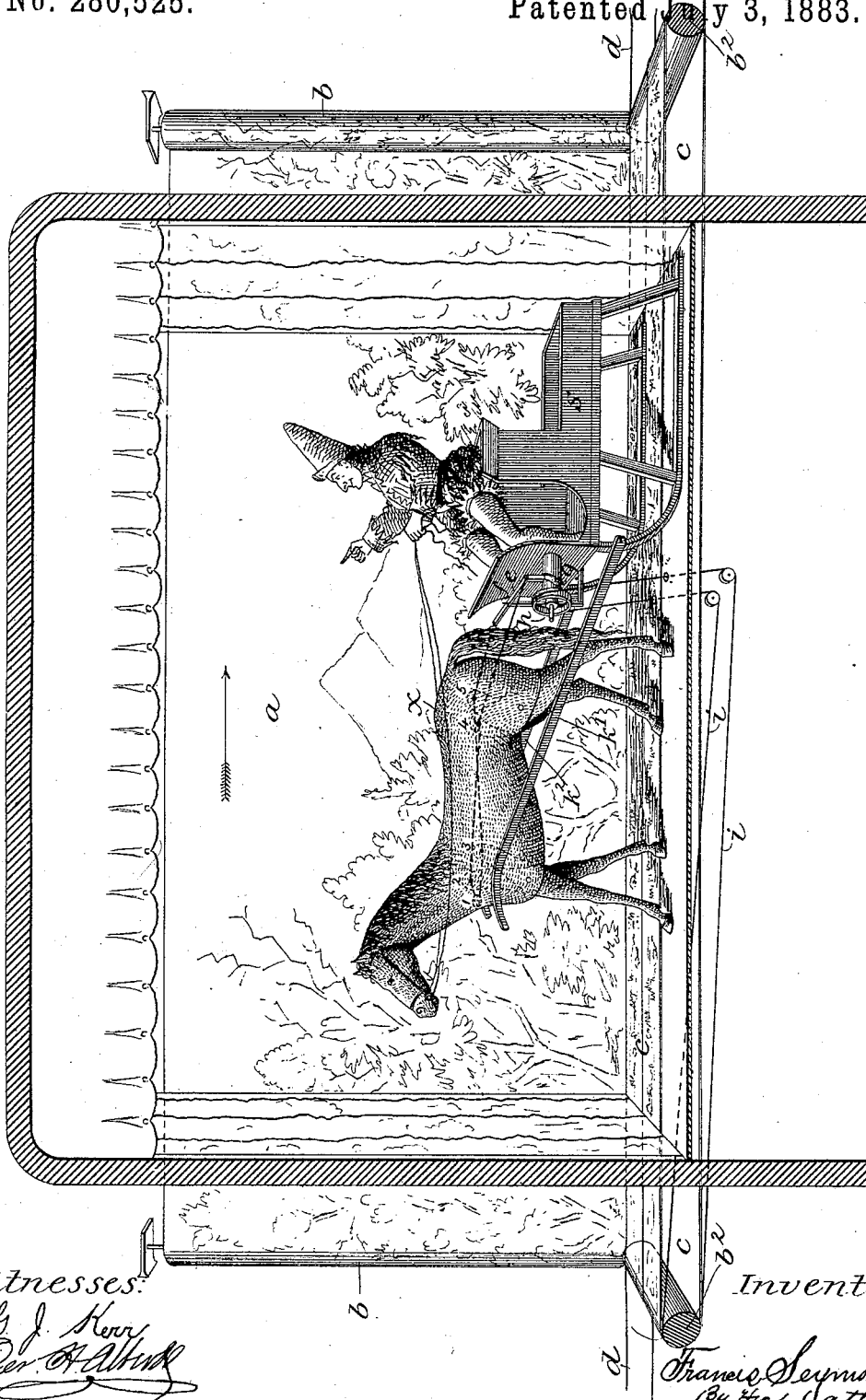
Witnesses:
Inventor:

UNITED STATES PATENT OFFICE.

FRANCIS SEYMOUR, OF PATERSON, NEW JERSEY.

THEATRICAL APPLIANCE.

SPECIFICATION forming part of Letters Patent No. 280,525, dated July 3, 1883.

Application filed December 22, 1882. (No model.)

*To all whom it may concern:*

Be it known that I, FRANCIS SEYMOUR, a citizen of the United States, residing at Paterson, in the county of Passaic and State of New Jersey, have invented new and useful Theatrical Appliances, to be used in stage representations, scenes of plays, and also to be used in miniature, as in toys, of which the following is a specification.

My invention, the essence of which is a mechanical device appearing to proceed and recede, whereas it is stationary and remains in the same place, the effect being caused by a moving panorama behind it, is shown in the accompanying drawing, representing a perspective view, which forms a part of this specification.

The device may consist of one or more mechanical horses, X, connected with a sleigh or other vehicle, S, placed on the stage, the legs of the horses to be connected within the body, at the points 1, 2, 3, 4, and 5, with cords or other contrivances which are connected with the other parts, as hereinafter set forth. Behind the horses and vehicle is a panorama, $a$, which may be simply endless around the rollers $b$, or may be an elaborate affair of great length, working off one roller onto the other, the scenery on the moving panorama to be changing, according to fancy. On the floor is another panorama, $c$, representing the ground. This ground panorama $c$ may be in strips, so as to pass the feet of the horses and the runners or wheels of the vehicle, as the case may be, and it works on rollers $b^2$. The rollers on which the scenes work will be closed from view by masking in each side of the stage. The rollers are connected with belts or gears at $d$. The cords connecting the horses' legs are secured to a cross-bar, $e$, which is pivoted at its center $f$, and is caused to move the horses' legs by the cam $g$, which moves the bar $e$. Said cam $g$ revolves on the shaft $h$, which is driven by the belt $i$ from the bottom of the scene-roller $b^2$.

All the parts, now being connected, can be put in operation by power being applied. The panoramas moving in the opposite direction to which the horses are facing produces the effect of the horses, vehicle, and occupants of the vehicle advancing along the road through the country represented on the moving panoramas, and the pleasing and deceptive effect that the party are or may be seen from the start to the end of their journey. The horses are supported by braces $k'$ and $k^2$, and their legs can be given the running motion or walking motion, as desired.

In toys power may be supplied by a crank or by clock-work.

I do not confine myself to details as shown.

Having shown and described my invention, I desire to secure it by Letters Patent and claim—

1. Mechanical animals X, the legs of which work on pivots, and are connected within the body, at 1, 2, 3, 4, and 5, by cords or their equivalents, which are connected with the cross-bar $e$, said cross-bar $e$ being operated by the rotation of the cam $g$, all in combination with the sleigh or other vehicle, substantially as shown and described, and for the purpose specified.

2. The rollers $b$ and $b^2$, in combination with the moving panoramas $a$ and $c$, the belt driving the shaft and pulley $h$, the cam $g$, and the cross-bar $e$, operating the movement of legs of the mechanical animal X, substantially as shown and described, and for the purposes specified.

3. The combination of the moving panoramas $a$ and $c$, the mechanical animal X, and the vehicle S, substantially as shown and described, and for the purposes specified.

4. The combination of the rollers $b$ and $b^2$, the moving panoramas $a$ and $c$, the mechanical animal X, and the vehicle S, substantially as shown and described, and for the purposes set forth.

5. The combination of the rollers $b$ and $b^2$ the moving panoramas $a$ and $c$, the belt driving the shaft and pulley $h$, the cam $g$, the cross-bar $e$, the cords connecting legs at 1, 2, 3, 4, and 5, the mechanical animal X, and vehicle S, substantially as shown and described, and for the purposes specified.

FRANCIS SEYMOUR.

Witnesses:
A. DERROM, Jr.,
GEO. A. ALBURT.